United States Patent [19]

Ordonez

[11] Patent Number: 5,653,488
[45] Date of Patent: Aug. 5, 1997

[54] ARTICLE FOR MANIPULATING FOOD

[76] Inventor: Gonzalo A. Ordonez, Rohrmoser, AptosAngelita 1, San Jose, Costa Rica

[21] Appl. No.: 569,695

[22] Filed: Dec. 8, 1995

[51] Int. Cl.⁶ .................................................. A47J 43/28
[52] U.S. Cl. .................. 294/3; 294/16; 294/118; 294/902
[58] Field of Search ................... 294/2, 3, 5, 8.5, 294/11, 16, 28, 31.1, 50.8, 106, 118, 902; 7/132, 134; 30/124, 134, 142, 193, 194, 232

[56] References Cited

U.S. PATENT DOCUMENTS

| | | | |
|---|---|---|---|
| 913,225 | 2/1909 | Moline | 294/118 X |
| 1,115,838 | 11/1914 | Kopf | 294/118 X |
| 1,623,679 | 4/1927 | Hosler | 294/28 |
| 2,024,849 | 8/1935 | Eliopoulos | 294/99.2 |
| 2,263,965 | 11/1941 | Fiori | 294/99.2 |
| 2,559,978 | 7/1951 | Marco | 294/28 |
| 2,601,766 | 4/1952 | Riddell et al. | 294/99.2 X |
| 2,747,912 | 5/1956 | Franklin | 294/28 X |
| 3,367,703 | 2/1968 | Pittis | 294/16 |
| 3,628,818 | 12/1971 | Pittman | 294/118 |
| 4,033,388 | 7/1977 | Ruegger | 140/106 |
| 4,577,900 | 3/1986 | Chasen | 294/16 X |
| 4,771,541 | 9/1988 | Bouchakian | 30/148 |
| 4,904,009 | 2/1990 | Kozlinski | 294/118 X |
| 4,984,367 | 1/1991 | Albanese | 30/147 |
| 5,014,431 | 5/1991 | Jebe et al. | 30/124 |
| 5,075,975 | 12/1991 | Wilson | 30/322 |
| 5,115,565 | 5/1992 | Narlock et al. | 30/123.6 |
| 5,398,415 | 3/1995 | Collins, Jr. | 30/124 |

FOREIGN PATENT DOCUMENTS

| | | |
|---|---|---|
| 811925 | 4/1937 | France . |
| 615801 | 8/1933 | Germany . |

*Primary Examiner*—Johnny D. Cherry
*Attorney, Agent, or Firm*—Oppedahl & Larson

[57] ABSTRACT

A tong-like eating utensil has gripping portions on each piece of the tong for gripping large pieces of food such as chicken pieces. The gripping portions have posts extending into the space between the gripping portions to hold the food more securely and two aligned plates which can be pressed together to grip smaller pieces of food. Optionally, the utensil includes cutting members extending from the ends of the tongs which can be used to cut food.

17 Claims, 2 Drawing Sheets

ARTICLE FOR MANIPULATING FOOD

BACKGROUND OF THE INVENTION

This application relates to an article for manipulating food which combines aspects of a pair of tongs which can be used to grip irregularly shaped foods such as chicken pieces and a cutter for trimming pieces of food.

Various specialty food handling devices have been developed over the years, including asparagus tongs, snail tongs and the like. Each of these devices serves a single narrow function, however, and they do not serve as common eating utensils for use with every day foods. Nevertheless, many every day foods, particularly chicken pieces, are difficult to handle with traditional silverware, i.e., knife, fork and spoon. It would therefore be advantageous to provide an eating utensil which allows a person to easily handle and preferably to cut pieces of chicken and other irregularly shaped food items, without getting their hands dirty or greasy. It is an object of the present invention to provide such an eating utensil.

SUMMARY OF THE INVENTION

These and other objects of the invention are met by an article of manufacture for manipulating food comprising:

(a) a first body member comprising
  a handle portion formed as a first loop;
  a middle portion extending from the handle portion;
  a gripper support portion extending from the middle portion;
  a gripping portion formed as a second loop, said second loop extending from an end of the gripper support portion remote from the middle portion and bending around to contact the gripper support portion at a point near the middle portion, said middle portion and said second loop being disposed in planes which are substantially perpendicular to each other;

(b) a second body member comprising
  a handle portion formed as a first loop;
  a middle portion extending from the handle portion;
  a gripper support portion extending from the middle portion;
  a gripping portion formed as a second loop; said second loop extending from an end of the gripper support portion remote from the middle portion and bending around to contact the gripper support portion at a point near the middle portion, said middle portion and said second loop being disposed in planes which are substantially perpendicular to each other;

(c) means for pivotably affixing the middle portion of the first body member to the middle portion of the second body member to form a pair of tongs in which the gripping portions are aligned and are movable between an open position and a closed position in response to a corresponding movement of the handle members;

(d) a plurality of posts affixed to each of said gripping portions, said posts extending substantially perpendicularly from the gripping portions and being aligned to avoid contact with the posts affixed to the other gripping portion when the article is in the closed position; and (e) a pair of preferably flat plates, one affixed to each of the gripping portions and being substantially coplanar therewith, said plates bearing against one another when the article is in the closed position to permit capture of small pieces of food. The eating utensil may also include a first cutting member affixed to the end of the gripper support portion of the first body member; and a second cutting member affixed to the end of the gripper support portion of the second body member, wherein the first and second cutting members bear on one another to provide a cutting action when the article is in the closed position.

DETAILED DESCRIPTION OF THE INVENTION

Figure 1:
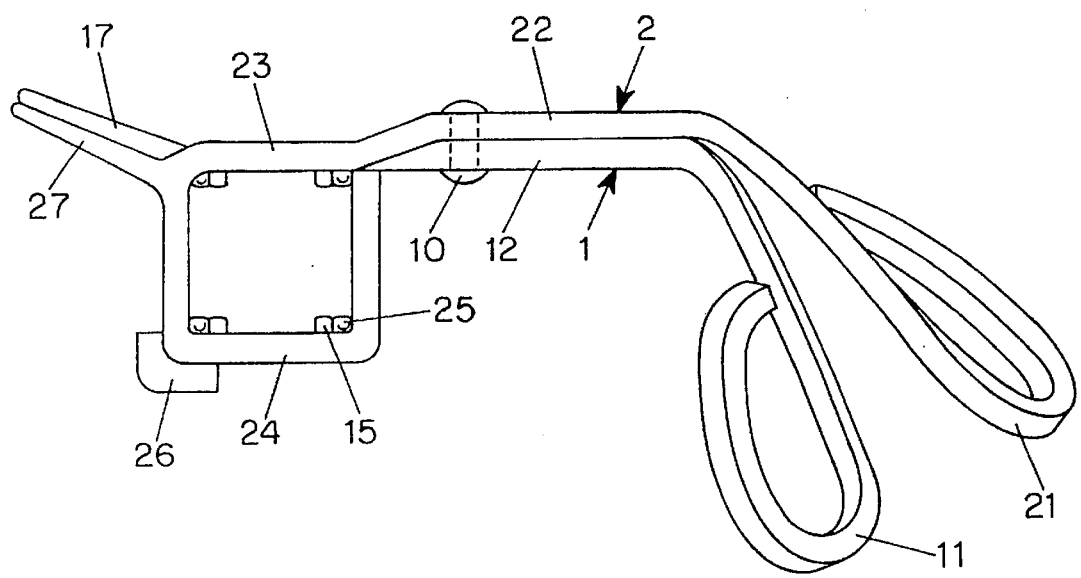
FIG. 1 shows a side view of a first embodiment of the present invention.
Figure 2:
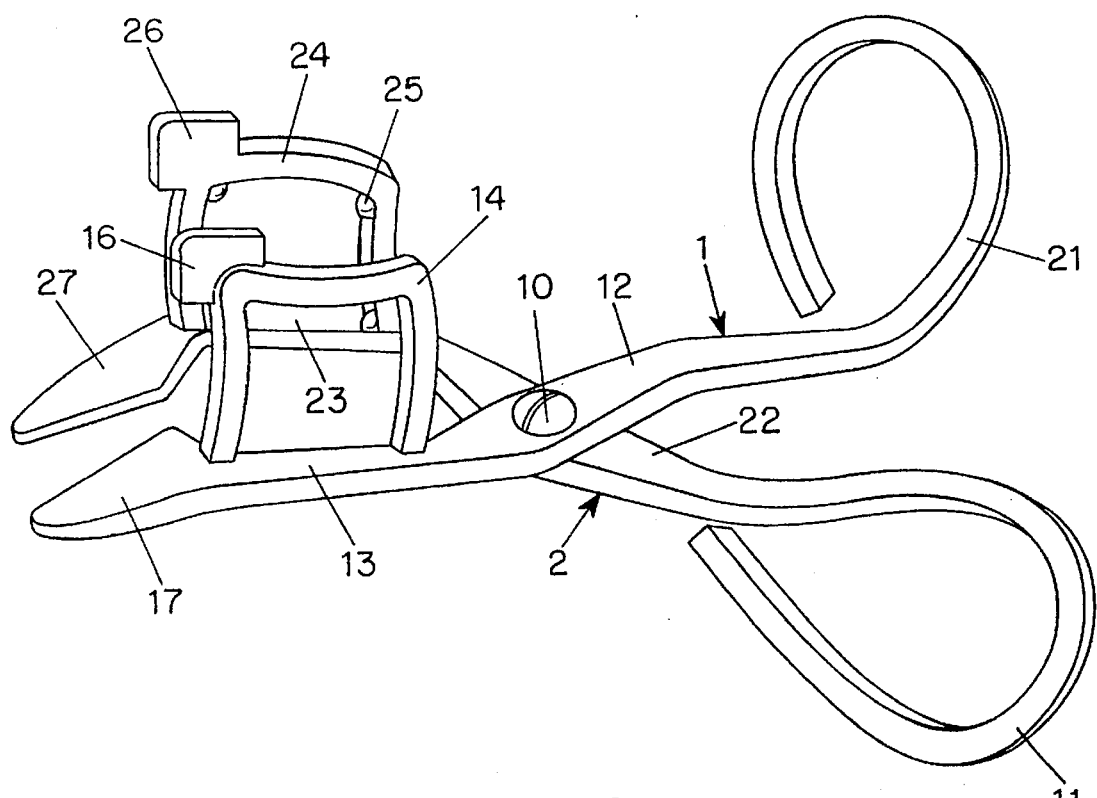
FIG. 2 shows a perspective view of the first embodiment of the invention.

FIGS. 1 and 2 show a first embodiment of the present invention. As shown, the article has two body members 1 and 2, each formed from an elongated material, for example a metal wire, particularly stainless steel, or molded plastic. Each body member is made up of four parts, a handle portion 11, 21 formed from a first loop of the elongated material; a middle portion 12, 22 extending from the handle portion; a gripper support portion 13, 23 extending from the middle portion; and a gripping portion 14, 24. The gripping portion may be formed from a second loop of the elongated material as shown in FIG. 1, or may be a separate loop which is affixed to the gripper support portion. In either case, the gripping portions 14, 24 extend from the ends of the gripper support portions remote from the middle portions and bend around to contact the gripper support portions 13, 23 at a point near the middle portion. As shown, the gripping portions are in a plane which is substantially perpendicular to the plane containing the remainder of the article.

The two body members are affixed together with a fastener 10, for example with a screw or rivet, to permit pivoting movement of the body members relative to one another. Thus, the two body members form a pair of tongs which is moveable between an open position, where the gripping portions are separated to accept a piece of food, and a closed position where the gripping members grasp food placed between them.

The article shown in FIGS. 1 and 2 also has a plurality of posts 15, 25 affixed to each of said gripping portions 14, 24. The posts 15, 25 extend substantially perpendicularly from the gripping portions 14, 24 in a direction toward the gripping portion of the other body member and are aligned so that they do not contact the posts from the other gripping portion when the article is in the closed position. These posts may be brazed or spot welded in place in the case of a metal article, or be glued or part of a continuous molded piece in the case of a plastic article.

The article shown in FIGS. 1 and 2 also has a pair of preferably flat plates 16, 26, one affixed to each of the gripping portions 14, 24 and being substantially coplanar therewith. The plates 16, 26 bear against one another when the article is in the closed position to permit capture of small pieces of food.

Finally, the article shown in FIGS. 1 and 2 includes a pair of cutting members 17, 27. The cutting members extend from the end of the gripper support portions 13, 23 and bear upon one another to provide a cutting action when the article is in the closed position.

Figure 3:
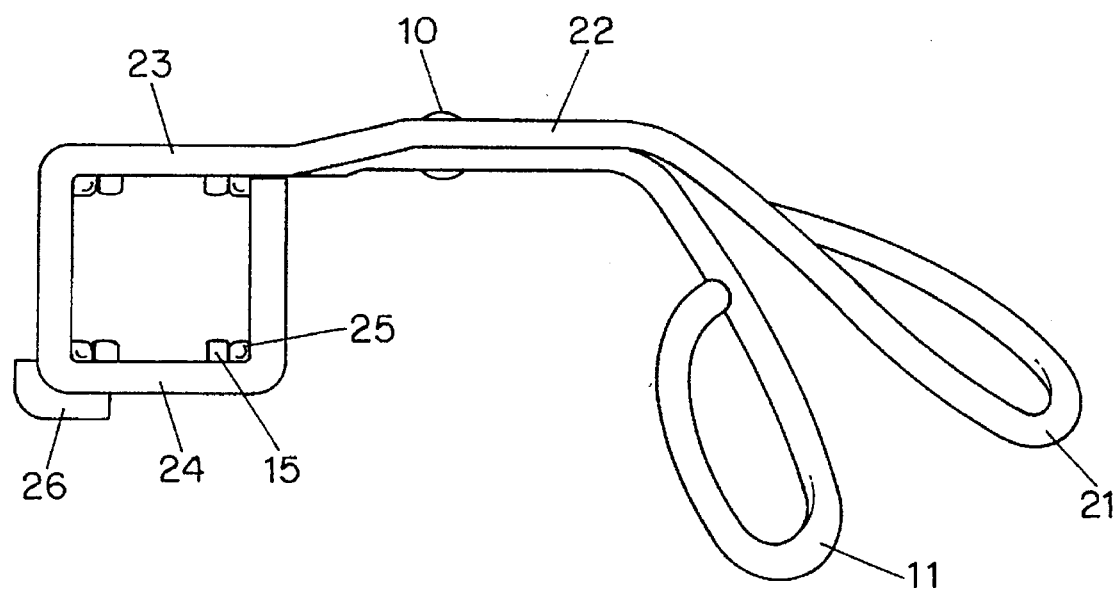
FIG. 3 shows a side view of a second embodiment of the invention.
Figure 4:
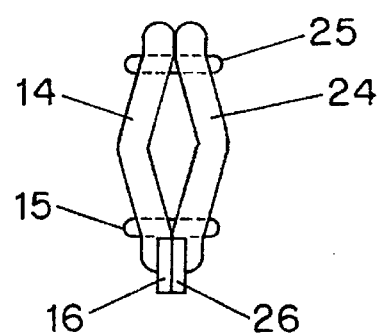
FIG. 4 shows an end view of the gripping portions of the second embodiment of the invention.

FIGS. 3 and 4 show two views of an alternative embodiment of the invention in which the cutting members are omitted.

While the foregoing discussion discloses the significant features of the invention, it will be appreciated that there are numerous variations which can be made without departing from the scope of the invention. For example, in the eating utensil as depicted in FIGS. 1–3, the handle portions of each body member are shown deflected out of the plane containing the middle portions. Such deflection may enhance the ease of use for some persons, but it is not required, and devices in which the handle portions are substantially coplanar with the middle portions are fully contemplated by this invention.

Similarly, while the plates for gripping small pieces of food are shown at the outermost corner of and extending beyond the gripping portion in the Figures, it will be appreciated that these plates could be placed in other positions. For example, the plates could be placed entirely within the loop of the gripping portion, or be disposed in a different part of the loop.

I claim:

1. An article for manipulating food comprising:
   (a) a first body member comprising
      a handle portion formed as a first loop;
      a middle portion extending from the handle portion;
      a gripper support portion extending from the middle portion;
      a gripping portion formed as a second loop; said second loop extending from an end of the gripper support portion remote from the middle portion and bending around to contact the gripper support portion at a point near the middle portion, said middle portion and said second loop being disposed in planes which are substantially perpendicular to each other;
   (b) a second body member comprising
      a handle portion formed as a first loop;
      a middle portion extending from the handle portion;
      a gripper support portion extending from the middle portion;
      a gripping portion formed as a second loop; said second loop extending from an end of the gripper support portion remote from the middle portion and bending around to contact the gripper support portion at a point near the middle portion, said middle portion and said second loop being disposed in planes which are substantially perpendicular to each other;
   (c) means for pivotably affixing the middle portion of the first body member to the middle portion of the second body member to form a pair of tongs in which the gripping portions are aligned and are movable between an open position and a closed position in response to a corresponding movement of the handle portions;
   (d) a plurality of posts affixed to each of said gripping portions, said posts extending substantially perpendicularly from the gripping portions and being aligned to avoid contact with the posts affixed to the other gripping portion when the article is in the closed position; and
   (e) a pair of plates, one affixed to each of the gripping portions and being substantially coplanar therewith, said plates bearing against one another when the article is in the closed position to permit capture of small pieces of food.

2. The article of claim 1, further comprising
   a first cutting member affixed to the end of the gripper support portion of the first body member; and
   a second cutting member affixed to the end of the gripper support portion of the second body member, wherein the first and second body members bear on one another to provide a cutting action when the article is in the closed position.

3. The article of claim 2, wherein the article is made of metal.

4. The article of claim 2, wherein the article is made of plastic.

5. The article of claim 1, wherein the article is made of metal.

6. The article of claim 1, wherein the article is made of plastic.

7. The article of claim 1, wherein each body member is made from a single piece of material.

8. The article of claim 7, wherein the article is made of plastic.

9. An article for manipulating food comprising:
   (a) a first body member comprising
      a handle portion formed as a first loop;
      a middle portion extending from the handle portion;
      a gripper support portion extending from the middle portion;
      a gripping portion formed as a second loop, said second loop extending from an end of the gripper support portion remote from the middle portion and bending around to contact the gripper support portion at a point near the middle portion, said middle portion and said second loop being disposed in planes which are substantially perpendicular to each other;
   (b) a second body member comprising
      a handle portion formed as a first loop;
      a middle portion extending from the handle portion;
      a gripper support portion extending from the middle portion;
      a gripping portion formed as a second loop, said second loop extending from an end of the gripper support portion remote from the middle portion and bending around to contact the gripper support portion at a point near the middle portion, said middle portion and said second loop being disposed in planes which are substantially perpendicular to each other;
   (c) means for pivotably affixing the middle portion of the first body member to the middle portion of the second body member to form a pair of tongs in which the gripping portions are aligned and are movable between an open position and a closed position in response to a corresponding movement of the handle members;
   (d) a first cutting member affixed to the end of the gripper support portion of the first body member; and
   (e) a second cutting member affixed to the end of the gripper support portion of the second body member, wherein the first and second body members bear on one another to provide a cutting action when the article is in the closed position.

10. The article of claim 9, wherein the article is made of metal.

11. The article of claim 9 further comprising
   a plurality of posts affixed to each of said gripping portions, said posts extending substantially perpendicularly from the gripping portions and being aligned to contact the posts affixed to the other gripping portion when the article is in the closed position.

12. The article of claim 11, wherein the elongated material is metal.

13. The article of claim 11, wherein the article is made of plastic.

14. The article of claim 9, further comprising a pair of plates, one affixed to each of the gripping portions and being substantially coplanar therewith, said plates bearing against one another when the article is in the closed position to permit capture of small pieces of food.

15. The article of claim 14, wherein the article is made of metal.

16. The article of claim 14, wherein the article is made of plastic.

17. The article of claim 9, wherein the each body member is made from a single piece of material.

* * * * *